(12) United States Patent
Kobayashi

(10) Patent No.: US 6,774,334 B1
(45) Date of Patent: Aug. 10, 2004

(54) WIRE ELECTRIC DISCHARGE MACHINING OF CORNERS

(75) Inventor: Hiroatsu Kobayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/169,016

(22) PCT Filed: Oct. 27, 2000

(86) PCT No.: PCT/JP00/07568

§ 371 (c)(1),
(2), (4) Date: Jun. 26, 2002

(87) PCT Pub. No.: WO02/36295

PCT Pub. Date: May 10, 2002

(51) Int. Cl.$^7$ .............................................. B23H 7/02
(52) U.S. Cl. ................................................ 219/69.12
(58) Field of Search ...................................... 219/69.12

(56) References Cited

U.S. PATENT DOCUMENTS

| | | | | |
|---|---|---|---|---|
| 4,581,513 A | * | 4/1986 | Obara et al. | 219/69.12 |
| 4,703,143 A | * | 10/1987 | Okubo et al. | 219/69.12 |
| 4,725,706 A | * | 2/1988 | Inoue | 219/69.12 |
| 5,410,117 A | * | 4/1995 | Reynier et al. | 219/69.12 |
| 5,573,681 A | * | 11/1996 | Ishibashi et al. | 219/69.12 |
| 5,756,954 A | * | 5/1998 | Kamiguchi et al. | 219/69.12 |
| 5,756,956 A | | 5/1998 | Sato et al. | |

FOREIGN PATENT DOCUMENTS

| | | | |
|---|---|---|---|
| JP | 62-19322 | | 1/1987 |
| JP | 6-238521 A | * | 8/1994 |
| JP | 7-32219 A | * | 2/1995 |
| JP | 7-32220 A | * | 2/1995 |
| JP | 7-32221 A | * | 2/1995 |
| JP | 7-32222 A | * | 2/1995 |
| JP | 8-90342 | | 4/1996 |
| JP | 8-118146 | | 5/1996 |

* cited by examiner

Primary Examiner—Geoffrey S. Evans
(74) Attorney, Agent, or Firm—Sughrue Mion, PLLC

(57) ABSTRACT

A wire discharge machining method that involves decreasing gradually a discharge energy from a position (point A) a first predetermined distance (Lpre) prior to a corner portion entry (point B) on machining path of a wire electrode (1), stopping a relative movement between the wire electrode (1) and the workpiece (2) at a corner portion entry (point B), releasing the stopped movement in accordance with a predetermined decision criterion, working the workpiece from the point B to a position (point D) a second distance (L) away from a position (point C) after passing the corner portion with a lower discharge energy that is reduced at a certain reduction to the discharge energy at point A, and working the workpiece by increasing gradually the discharge energy from point D to a position (point E) passing a third distance (Lpost).

17 Claims, 7 Drawing Sheets

WIRE ELECTRIC DISCHARGE MACHINING OF CORNERS

This application is a 371 of PCT/JP00/07568, filed Oct. 27, 2000.

TECHNICAL FIELD

The present invention relates to improvements in a wire discharge machining method and apparatus that machines a workpiece by supplying working electric power to an interpole space between a wire electrode and the workpiece and producing a discharge.

BACKGROUND ART

FIG. 10 is an explanatory diagram showing a conventional wire discharge machining apparatus. In FIG. 10, this wire discharge machining apparatus comprises a wire electrode 1, a workpiece 2, a wire bobbin 3, a working fluid 4, working fluid nozzles 5a and 5b as working fluid supplying means for supplying the working fluid 4 to an interpole space between the wire electrode 1 and the workpiece 2, a capstan roller 6, a pinch roller 7, an X table 8 for driving the workpiece 2 in a horizontal direction (X direction), a Y table 9 for driving the workpiece 2 in a horizontal direction (Y direction), an X-axis servo amplifier 10 for controlling a drive motor, not shown, for driving the X table 8, a Y-axis servo amplfier 11 for controlling a drive mrotor, not shown, for driving the Y table 9, working power supplying means 12, bath voltage detecting means 13, and control means 14.

The operation will be described below. The wire electrode 1 is carried between the capstan roller 6 and the pinch roller 7, and dragged to be opposed against the workpiece 2. A working electric power as discharge energy is supplied into the interpole space between the wire electrode 1 and the workpiece 2 by the working power supplying means 12, while the working fluid 4 is supplied into the interpole space through the working fluid nozzles 5a and 5b, whereby the workpiece 2 is worked into a predetermined contour shape by moving the workpiece 2 relative to the wire electrode 1 employing the X table 8 and the Y table 9 as positioning means. The control means 14 controls the positioning means to position the workpiece 2 relative to the wire electrode 1 and makes control for the electrical machining conditions.

FIG. 11 is an explanatory view showing a machining example of a corner portion by the conventional wire discharge machining apparatus. In FIG. 11, reference numeral 1 denotes a wire electrode, reference numeral 2 denotes a workpiece, reference numeral 15a denotes an outer corner, reference numeral 15b denotes an Lnner corner, and the paths A to E denote machining paths of the wire electrode 1 to machine the workpiece 2.

FIG. 11(a) is a view showing a machining example in which an edge corner portion is machined, and FIG. 11(b) is a view showing a machining example in which a circular arc corner portion is machined.

For instance, in a case where the edge corner portion of the workpiece 2 is worked by moving the wire electrode 1 along the path A to C to E, it is known that a round shear droop as indicated by the solid line is produced in the outer corner portion 15a and the inner corner portion 15b, as shown in FIG. 11(a). Thi s shear droop may be caused by low rigidity of the wire electrode 1. That is, the wire electrode 1 is deflected due to a discharge reaction force developed between the wire electrode 1 and the workpiece 2, forcing the wire electrode 1 to actually take the path A to B to D to E, so that the workpiece 1 is worked excessively in the outer corner portion 15a, and unworked in the inner corner portion 15b. The size of this shear droop is increased as the discharge reaction force is larger, or the machining rate is higher, and gets to about several tens $\mu$m to several hundreds $\mu$m in the ordinary roughing.

In a case where the circular arc corner portion of FIG. 11(b) is worked, the wire electrode 1 is run along the path A to B to F to D to E, but practically takes the path A to B to G to D to E, due to the same reason, so that a shear droop is produced in the outer corner portion 15a and the inner corner portion 15b in the same way as in FIG. 11(a).

As described above, in working the corner portion, there was a problem that a shear droop was produced in the edge corner portion and the circular arc corner portion, resuitino in a lower precision of the machined configuration.

The techniques for preventing such shear droop from arising in the ccrner portion of the workpiece in machining the corner portionweredisclosedin JP-A-2571077, JP-A-8-39356 and JP-A-2000-84743. The conventional art involves improvements in the machining precision of the corner portion by changing the relative movement speed of the wire electrode to the workpiece before and after the corner portion, and the electrical machining conditions to reduce a deflection of the wire electrode while machining the corner portion.

In these conventional arts, however, the corner portion is worked by using a significantly smaller discharge energy than when the linear portion is worked to reduce deflection of the wire electrode in working the corner portion, resulting in quite lower machining rate. Such a significant reduction in the machining rate may be the to be a lethal problem for the wire discharge machining apparatus in the light of the present situation in which the important factors of performance required are regarded to be the machining precision and the machining productivity.

Along with the improvements in the wire discharge machining in the respects of the power control for preventing disconnection or the wire electrode, the machining rate of the wire discharge machining is increased rapidly up to about 200 to 250 mm$^2$/min, or about 350 to 400 mm$^2$/min at the maximum machining rate, for example. That is, the discharge energy input into the interpole space between the wire electrode and the workpiece is increased. Accordingly, the wire electrode is more deflected during the machining due to an increased discharge reaction force. In such current situation, there is a problem that when the corner portion is worked at a desired precision employing the techniques of the conventional art, the machining rate is decreased significantly in the corner portion, offsetting the effect of higher machining rate, irrespective of an increased input discharge energy.

As described above, it is very important that the machining configuration precision of the corner portion is improved in machining the corner portion of the workpiece, and the machining productivity is enhanced by recducing the machining time for the corner portion to the minimum.

As a method of suppressing the increased machining time for the corner portion, it is known to correct the machining path. However with such method, the corner portion may be worked while the wire electrode is deflected, whereby it was impossible to improve the configuration precision of the corner portion over the entire area from the upper face of the workpiece through the sublevel face to the lower face. Accordingly, it is considered that the wire electrode may be deflected as least as possible, namely, the discharge energy may be decreased down to the minimum, at the corner portion to improve the machining configuration precision of the corner portion over the entire area from the upper face of the workpiece through the sublevel face to the lower face, thereby working the corner portion at the slowest machining rate. Hence, in the conventional art, there was another problem that the machining configuration precision and the machining productivity could not be improved consistently in working the corner portion of the workpiece.

DISCLOSURE OF INVENTION

The present invention has been achieved to solve the above-menticned problems, and it is an object of the invention to provide a wire discharge machining method and apparatus in which the machining configuration precision and machining productivity for the corner portion can be improved consistently in working the corner portion.

A wire discharge machining method according to this invention for machining a workpiece by supplying a discharge energy into an interpole space between a wire electrode and the workpiece while moving the workpiece relative to the wire electrode includes a first step of working the workpiece by decreasing gradually the discharge energy from a point located a first predetermined distance prior to a corner portion entry on a machining path of the wire electrode, a second step of stopping the relative movement between the wire electrode and the workpiece at the corner portion entry, a third step of releasing the stopped relative movement in accordance with a predetermined decision criterion, a fourth step of working the workpiece in the corner portion and a portion extending a second distance away from the corner portion on the machining path of the wire electrode with a lower discharge energy that is reduced at a certain reduction ratio to the discharge energy at the first predetermined distance prior to the corner portion entry according to at least one of the first condition that is determined by the corner configuration, such as the radius and angle of the corner portion and the second condition that is determinedby the requisition specification such as a desired machining configuration precision, and a fifth step of working the workpiece by increasing gradually the discharge energy after passing the second distance till passing a third distance on the machining path of the wire electrode.

The wire discharge machining method according to the invention further includes making almost constant a temporal change rate of the discharge energy in working the workpiece at at least one of the first step and the fifth step.

Also, the wire discharge machining method according to the invention further includes varying the pulse quiescent time or mean bath voltage as a quadratic function of distance in working the workpiece at at least one of the first step and the fifth step.

Also, the wire discharge machining method according to the invention further includes the decision criterion at the third step of whether or not the discharge frequency is lower than or equal to a predetermined reference value, or the mean bath voltage is Breater than or equal to a predetermined reference value.

The wire discharge machining method according to the invention further includes the decision criterion at the third step of whether or not the discharge frequency is lower than or equal to a predetermined reference value or the stop time of the relative movement is longer than or equal to a reference time, or whether or not the mean bazh voltage is greater than or equal to a predetermined reference value or the stop time of the relative movement is longer than or equal to the reference time.

Also, the wire discharge machining method according to the invention further has different reference values corresponding to the inner corner side and the outer corner side of the corner portion, in which the decision criterion at the third step employs a reference value on the corner side that becomes the product side.

Also, the wire discharge machining method according to the invention further defines the second distance as the distance or simnilar distance from a transit point of the corner portion to a point at which the entire wire electrode fully enters into a working groove after effecting a directional change.

Also, the wire discharge machining method according to the invention further includes at least increasing the set value of wire tension above the set value before working the corner portion (e.g., the first step) or decreasing the set value of pressure or flow of a working fluid jet below the set value before working the corner portion at the second to fourth steps.

A wire discharge machining apparatus according to this invention foi machining a workpiece by supplying a discharge energy into an interpole space between a wire electrode and the workpiece by working power supplying means, and supplying a working fluid into the interpole space through working fluid supplying means, while moving the wire electrode and the workpiece relatively by positioning means comprises control means for controlling the working power supplying means to decrease gradually the discharge energy from a first predetermined distance prior to a corner portion entry on a machining path of the wire electrode, stopping the relative movement between the wire electrode and the workpiece at the corner portion entry, controlling the positioning means to release the stopped relative movement in accordance with a predetermined decision criterion and resume the relative movement, controlling the working power supplying means to decrease he discharge energy for working the workpiece in the corner portion arnn a portion extending a second distance away from the corner portion on the machining path of the wire electrode down to the discharge energy that is reduced at a certain reduction ratio to the discharge energy found at the first predetermined distance prior to the corner portion entry according to at least one of the first condition that is determiried by the corner configuration, such as the radius and angle of the corner portion and the second condition that is determined by the requisition specification such as a desired machining configuration precision, and controlling the working power supplying means to increase gradually the discharge energy after passing the second distance till passing a third distance on the machining path of the wire electrode.

Also, the wire discharge machining apparatus according to the invention further comprises the control means for controlling the working power supplying means to supply the discharge energy on the basis of the pulse quiescent time or mean bath voltage.

Also, the wire discharge machining apparatus according to the invention further comprises the control means for controlling the working power supplying means to decrease or increase gradually the discharge energy by making almost constant a temporal change rate of the discharge energy.

Also, the w4ire discharge machining apparatus according to the invention further comprises the control means for controlling the working power supplying means to decrease or increase gradually the discharge energy by varying the pulse quiescent time or mean bath voltage as a quadratic function of distance.

Also, the wire discharge machining apparatus according to the invention further has the predetermined decision criterion of judging whether or not the discharge frequency is lower than or equal to a certain reference value, or the mean bathvoltage is greater thanorequal to a certain reference value.

Also, the wire discharge machining apparatus according to the invention further has the predetermined decision criterion of whether or not the discharge frequency is lower than or equal to a certain reference value or the stop time of the relative movement is longer than or equal to a reference time, or whether or not the mean bath voltage is greater than or equal to a certain reference value or the stop time of the relative movement is longer than or equal to the reference time.

Also, the wire discharge machining apparatus according to the invention further has different reference values corresponding to the inner corner side and the outer corner side of the corner portion, in which the predetermined decision criterion employs a reference value on the corner side that becomes the product side.

Also, the wire discharge machining apparatus according to the invention further defines the second distance as the distance or similar distance from a transit point of the corner portion to a point at which the entire wire electrode fully enters into a working groove after effecting a directional change.

Also, the wire discharge machining apparatus according to the invention further comprises control means for at least increasing the set value of wire tension above the set value before working the corner portion or decreasing the set value of pressure or flow of a working fluid jet below the set value before working the corner portion ir a course from the point of the corner portion entry at which the relative movement between the wire electrode and the workplece is stopped till passing the second distance away from the corner portion.

BEST MODE FOR CARRYING OUT THE INVENTION

First Embodiment

Figure 1:
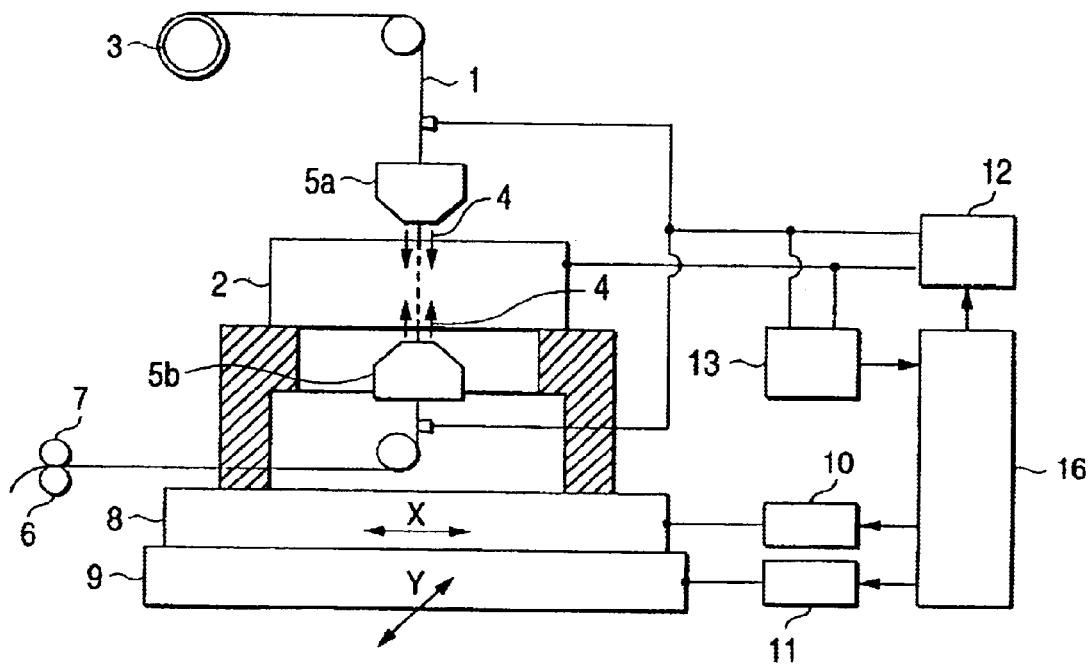
FIG. 1 is an explanatory diagram showing the constitution of a wire discharge machining apparatus according to a first embodiment of the present invention.

FIG. 1 is an explanatory diagram showing a wire discharge machining apparatus according to a first embodiment of this invention. In FIG. 1, this wire discharge machining apparatus comprises a wire electrode 1, a workplece 2, a wire bobbin 3, a working fluid 4, working fluid nozzles 5a and 5b as working fluid supplying means for supplying the working fluid 4 into an interpole space between the wire electrode 1 and the workpiece 2, a capstan roller 6, a pinch roller 7, an X table 8 for driving the workpiece 2 in a horizontal direction (X direction), a Y table 9 for driving the workpiece 2 in a horizontal direction (Y direction), an X-axis servo amplifier 10 for controlling a drive motor, not shown, for driving the X table 8, a Y-axis servo amplifier 11 for controlling the drive motor, not shown, for driving the Y table 9, working power supplying means 12, bath voltage detecting means 13, and control means 16.

The operation will be described below. The wire electrode 1, usually having a diameter from about 0.05 mm to 0.3 mm, is carried between the capstan roller 6 and the pinch roller 7, and dragged to be opposed against the workpiece 2. While a working electric power that is discharge energy is supplied into the interpole space by the working power supplying means 12 and the working fluid 4 is fed into the interpole space between the wire electrode . and the workpiece 2 through the working fluid nozzles 5a and 5b, the workpiece 2 is worked irto a predetermined contour shape by moving relatively the wire electrode 1 and the workpiece 2 that is placed on the X table 8 and the Y table 9 as positioning means. The control means 16 controls as a whole the positioning of the wire electrode 1 relative to the workpiece 2 by the positioning means and the electrical machining conditions.

With the wire discharge machining apparatus according to this invention, an instance of working the corner portion of the workpiece 2 will be described below.

In a case where the relative movement path of the wire electrode 1 to the workpiece 2 has a circular arc at the corner portion, for example, the machining conditions, including the diameter and type of the wire electrode used and the material and thickness of the workpiece, the pulse quiescent time, and thewdretension (for the inearworking), and the cornercontrcl parameters required for working the corner portion are set up and stored in memory means within the control means 16. The corner control parameters include the corner control pre-block distance (Lpre), thepuisequiescent-time (OFFpre) atthecorner portion entry, the mean bath voltage (VGpre) at the corner portion entry, the pulse quiescent time (OFFcorrer) while working the corner portion, the mean bath voltage (VGcorner) while working the corner portion, and the corner control post-block distance (Lpost).

Figure 2:
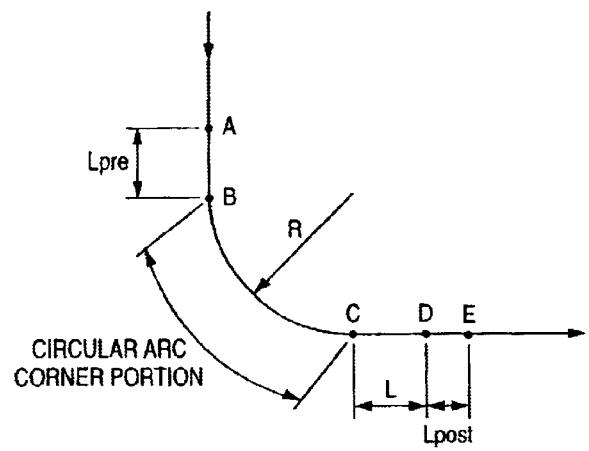
FIGS. 2(a)–2(c) are explanatory diagrams showing a wire discharge machining method according to the first embodiment of the invention.
Figure 2:
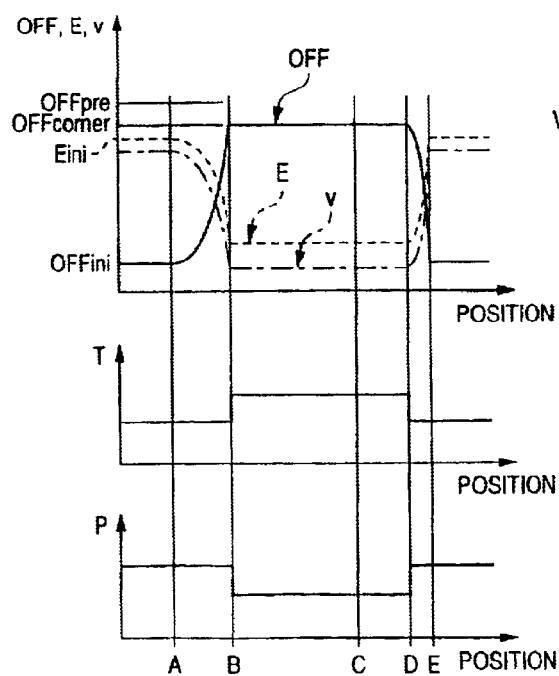
Figure 2:
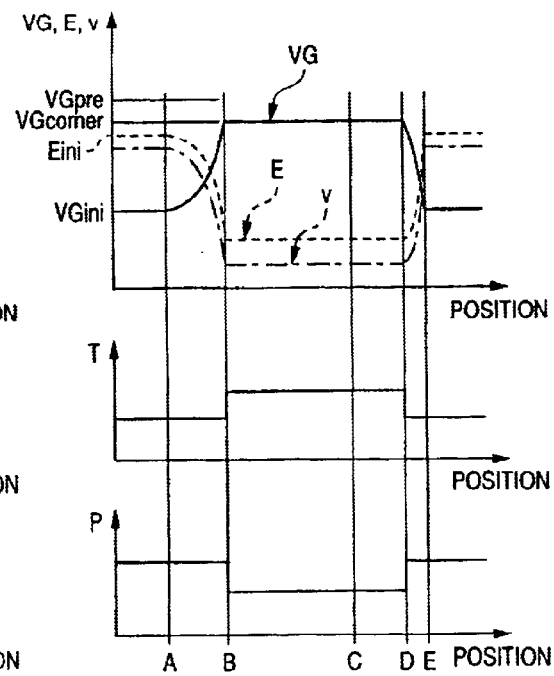

FIG. 2 is an explanatory diagram showing a wire discharge machining method according to the first embodiment of this invention. FIG. 2(a) is an explanatory diagram showing a machining process for the circular arc corner portion, FIG. 2(b) is an explanatory diagram showing the machining control of controlling the pulse quiescent time when the circular arc corner portion is machined, and FIG.

2(c) is an explanatory diagram showing the machining control of controlling the mean bath voltage when the circular arc corner portion is machined. In the same figure, reference signs OFF, VG, E and v denote the pulse quiescent time, the mean bath voltage, the discharge energy and the relative movement speed of the wire electrode to the workpiece, respectively. Also, reference signs Lpre, OFFpre, VGpre, OFFcorner, VGcorner and Lpost denote the corner control parameters, reference sign OFFini denotes the pulse quiescent time under the electrical machining conditions at a position (point A) a corner controL pre-block distance Lpre prior to the corner portion entry, reference sign VGini denotes the mean bath voltac. under the electrical machining conditions at the point A, reference sign R denotes the radius of the corner portion that is drawn by the machining path, reference sign P denotes the pressure or flow of the working fluid jet, and reference sign T denotes the wire tension.

In FIG. 2(a), the paths A to E indicate the machining paths of the wire electrode 1. In the wire discharge machining method according to the first embodiment of this invention, the pulse quiescent time OFF or the mean bath voltage VG is changed from the time when the wire electrode 1 reaches the point A located the corner control pre-block distance (Lpre) away from the entry B of the circular corner portion to the time when it reaches the entry B of the circular corner portion ir. accordance with the following expression (1) or (2) that is a quadratic function of the distance.

$$OFF = OFFini + \{(OFFpr - OFFini)/Lpre^2\} \cdot \{(Lpre - S1)^2\} \quad (1)$$

$$VG = VGini + \{(VGpre - VGini)/Lpre^2\} \cdot \{(Lpre - S1)^2\} \quad (2)$$

Where S1 is a residual distance to the corner portion entry B.

Figure 3:
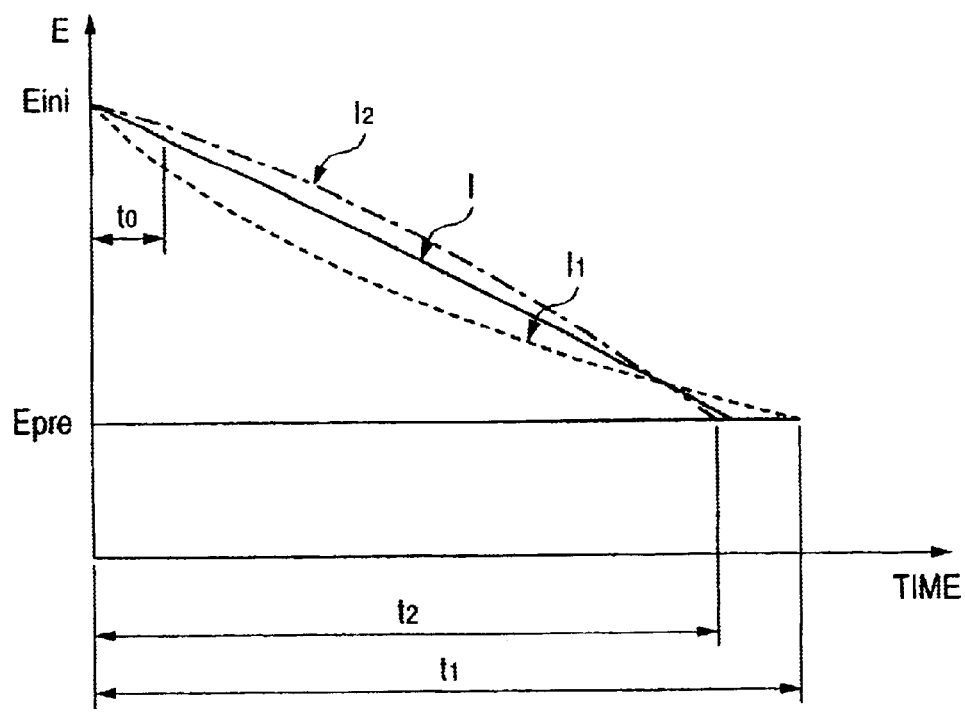
FIG. 3 is an explanatorydiagram showing how the discharge energy is changed in a corner control pre-biock distance.

FIG. 3 is an explanatory diagram showing how the discharge energy E changes in Lpre (from point A to point B) of FIG. 2. In FIG. 2, reference sign Eini denotes the discharge energy under the electrical machining conditions at the position (point A) the cornea control pre-block distance Lpre prior to the corner portion entry, reference sign Epre denotes the discharge energy at the corner portion entry (point B), reference sign l (solid line) denotes a line along which the discharge energy is changed at a constant temporal change rate, reference sign $l_1$ (broken line) denotes a curve showing the temporal change of the discharge energy in controlling the pulse quiescent time in accordance with a linear expression of the distance, as disclosed in JP-A-9-39356, for example, and reference sign $l_1$ (dashed lise) denotes a curve showing the temporal change of the discharge energy when the pulse quiescent time is controlled in accordance with the above-mentioned expression (1) or (2) according to this invention. Since the discharge energy and the machinin grate are in the proportional relation, the duration from point A to point B is $t_1$ for the curve $l_1$, or $t_2$ for the curve $l_2$.

The temporal change $l_1$ (dashed line) of the discharge energy in controlling the pulse quiescent time in accordance with the above-mentioned expression (1) or (2) in the wire discharge macnining method according to the first embodiment of this invention occurs at almost constant temporal change rate, and has a shorter duration from point A to point B as compared with the temporal change $l_1$ (broken line) of the discharge energy in controlling the pulse quiescent time in accordance with a linear expression of the distance. Therefore, the deflection of the wire electrode can be effectively decreased in a shorter time suitably by changing the pulse quiescent time or the mean bath voltage prior to the corner portion entry.

Figure 4:
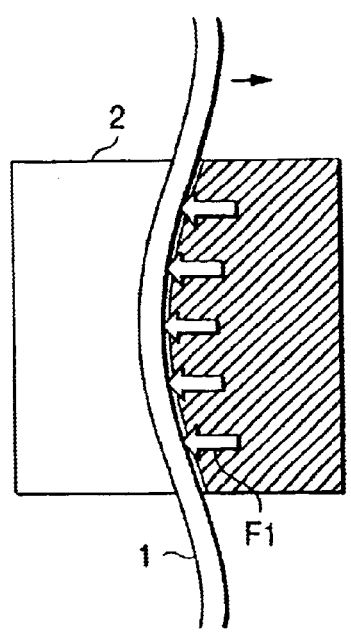
FIGS. 4(a) and 4(b) are explanatory views showing the instances where a short circuit occurs due to an abrupt change in the discharge reaction force.
Figure 4:
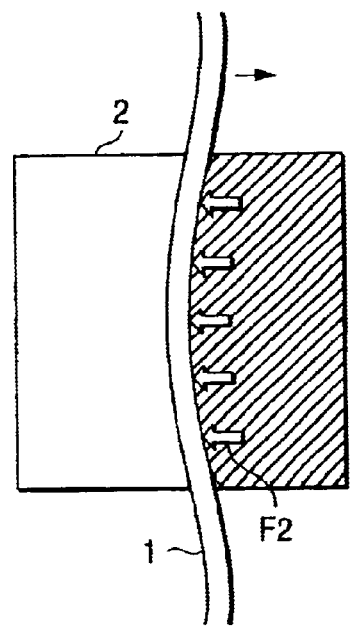

Comparing an instance where the temporal change rate of discharge energy is almost constant as indicated by $l_2$ and an instance where the pulse quiescent time is controlled in accordance with the linear expression of the distance as indicated by $l_1$ as shown in FIG. 3, the curve $l_1$ when the pulse quiescent time is controlled in accordance with the linear expression of the distance has agreater change rate of discharge energy at time $t_2$ after passing the point A as shown in FIG. 3. Accordingly, when the pulse quiescent time is controlled in accordance with the linear expression of the distance, the discharge reaction force is reduced rapidly from $F_1$ to $F_2$, so that the deflection of the wire electrod 1 is decrease abruptly, more likely causing a short circuit, as shown in FIGS. 4(a) and 4(b).

As described above, in the instance with the curve $l_2$ where the temporal change rate of the discharge energy is almost constant, the duration from point A to point B can be shorter, and the machining stability can be more favorable than in the instance with the curve $l_1$ where the pulse quiescent time is controlled in accordance with the linear expression of the distance. Hence, the machining configuration precision can be improved in Lpre (from point A to point B).

If the point B (circular corner portion entry) in FIG. 2(a) is reached, the pulse quiescent time OFF or the mean bath voltage VG is maintained at the pulse quiescent time OFFpre at the corner portion entry or the mean bath voltage VGpre at the corner portion entry, and the relative movement rate of the wire electrode 1 to the workpiece 2 is made zero, as shown in FIG. 2(b) or 2(c). While the relative movement speed is made zero, the wire tension T is increased above the wire tension under the set machining conditions before working he corner cortion, and the pressure or flow P of the working fluid jet is decreased below the pressure or flow of the working fluid jet under the set machining conditions before working the corner portion.

The discharge energy is gradually decreased while working the workpiece in the block Lpre (from point A to point B) so that the deflection of the wire electrode 1 is fully removed before reaching the entry B. If this block is too short, the deflection of the wire electrode 1 can not be fully removed and left behind at the time when the corner portion entry (point B in FIG. 2) is reached, although the discharge energy is fully decreased. Thereby, it is required to extend the time for which the relative movement speed is kept zero. On the contrary, if the discharge energy is decreased rapidly, the deflection of the wire electrode 1 is removed abruptly, so that the wire electrode 1 makes contact with the workpiece 2, thereby causing a short circuit. Also, if the relative movement speed is kept zero for a loncer time, there is a high possibility thatthe workpiece 1 is excessively worked particularly in the sublevel region of the workpiece 2, owing to vibration of the wire electrode 1, even though an interpole gap between the wire electrode 1 and the workpiece 2 being worked is always placed in the steady state. Consequently, the gouging unpreferably arises inthe inner corner portion. Accordingly, the deflection of the wire electrode must be removed before the corner portion entry, for which Lpre is set at a sufficiently larger value of distance than the amount of defiection of the wire electrode 1 during the linear working.

Though the discharge energy at the corner portion entry is determined by the set value of OFFpre or Vtjpre, if the discharge energy is not fully small at the corner portion enry, some wale streaks remain on the machined plane of the workpiece 2 because the wire electrode 1 is stopped abruptly by making the relative movement speed zero. Further, the time for which the relative movement speed is zero is longer, like when Lpre is too short. Accordingly, to avoid such a problem, the values of OFFpre and VGpre are set such that the discharge energy becomes fully small before reaching the corner portion entry.

However, even if the values of Lpre and OFFpre or VGpre are set as above, the relative movement speed of the wire electrode 1 to the workpiece 2 becomes extremely small at the time of reaching the corner portion entry. In such a case, needless to say, the wire electrode 1 is more or less deflected in an almost opposite direction of the relative movement, and the deflection of the wire electrode is by no means equal to zero. Accordingly, the relative movement speed of the wire electrode 1 to the workpiece 2 at the corner portion entry is made zero (relative movement stop), and this state is maintained for a certain time period, whereby the deflection of the wire electrode 1 can be fully removed.

When the relative movement is stopped, the relative movement speed is zero, the wire tension T is increased above the wire tension under the set machining conditions before working the corner portion, and the pressure or flow P of the working fluid jet is decreased below the pressure or flow of the working fluid jet under the set machining conditions before working the corner portion. In this way, when the relative movement is stopped, the vibration of the wire electrode 1 can be suppressed, and the greater wire tension produces a more force tending to remove the deflection of the wire electrode 1, so that the deflection of the wire electrode 1 can be removed more rapidly. Hence, it is possible to suppress excessive machining of the workpiece 2 that is prone to occur in the sublevel region of the workpiece 2, whereby the machining configuration precision and the machining productivity can be improved consistently.

When the relative movement stap time is too short, the deflection of the wire electrode may not be fully removed, so that the shear droop remains in the corner portion. On the other hand, when the relative movement stop time is too long, the workpiece may be excessively worked particularly in the sublevel region of the workpiece due to vibration of the wire electrode. To enhance the precision, it is important that the relative movement stop time is set correctly in a unit of second, for example. In the case where the relative movement stop time is set only using the elapse time as described in JP-A-2000-84743, the optimal stop time is difficult to obtain under all the machining conditions, possibly bringing about the atove-mentioned problem. For instance, if the optimal relative movement stop time is obtained in correspondence to the set values under various machining conditions, an empirical formula or a table for the relative movement stop time must be created, supposing all the machining conditions conceivable in practice, but the empirical formula or table is very difficult to create as an actual problem. Also, in the case where the user inputs the relative movement stop time, practically, the trial machining must be performed many times.

Figure 5:
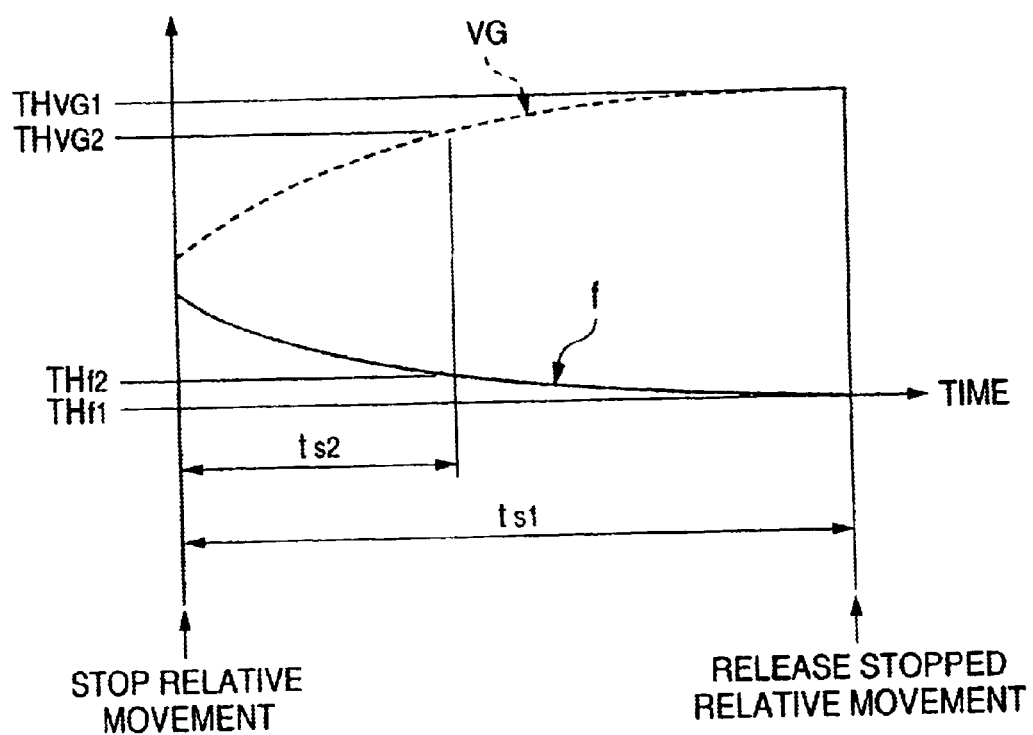
FIG. 5 is an explanatory dagram showing a condition setting method for releasing the stopped relative movement at a corner portion entry according to he first embodiment of this invention.

FIG. 5 is an explanatory diagram showing a condition setting method for releasing the stopped relative movement at the corner portion entry (point B in FIG. 2) according to the first embodiment of this invention. In FIG. 5, reference sign f denotes the discharge frequency, VG denotes the mean bath voltage, $THf_1$ denotes the reference value for discharge frequency, $THvG_1$ denotes the reference value for mean bath voltage, $THf_2$ denotes the reference value for discharge frequency in the case where deflection of the wire electrode is permitted to some extent, $THvG_2$ denotes the reference value for mean bath voltage in the case where deflection of the wire electrode is permitted to some extent, $ts_1$ denotes the relative movement stop time corresponding to $THf_1$ or $THvG_1$, and $ts_1$ denotes the relative movement stop time corresponding to $THf_2$ or $THvG_2$.

In the machining, as the deflection of the wire electrode disappears by stopping the relative movement, the interpole space approaches to an open state. Thereby, the discharge frequency f approaches to zero, and the mean bath voltage VG approaches to mean bath voltage (open voltage) in the open state, as shown in FIG. 5. This open voltage depends on a no-load voltage and the pulse quiescent time, and is determined by an electrostatic capacity and an inductance. The electrostatic capacity and the inductance are almost constant in any machine to eliminate differences in machining characteristics due to mechanical differences between the wire discharge machining apparatuses. Accordingly, in this invention, it is necessary to measure the open voltage corresponding to a number of set parameters for the no-load voltage anda number of set parameters for the pulse quiescent time in a machine. Since there is no need of machining the workpiece in practice in this measuring operation, the reference value of mean bath voltage for use as the releasing condition for the stopped relative movement can be simply determined.

As the decision criterion for the releasing condition for the stopped relative movement at the corner portion entry, whether or not the discharge frequency is lower than or equal to a predetermined reference value, or the mean bath voltage is greater than or equal to a predetermined reference value can be employed.

The reference value of discharge frequency may be set in the absolute value kHz, or the relative value % with respect to the linear working. The reference value of mean bath voltage or discharge frequency is set in accordance with the corner configuration including the radius R ct the corner portion and the corner portion angle. For example, in a case where R is larger and the wire electrode is allowed to have a certain amount of deflection, the reference value is changed to make the relative movement stop time shorter (lower reference value for the mean bath voltage ($THvG_2$) and higher reference value for the discharge frequency ($THf_2$)). In this way, the machining time can be shortened while improving the machining configuration precision at the corner portion.

Figure 6:
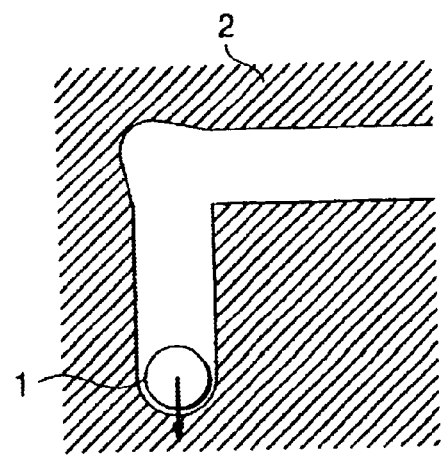
FIG. 6 is an explanatcryviewshowing an exampleof working a corner portion.

In a case where the deflection of wire electrode is less sufficiently removed before stopping the relative movement and the relative movement stop time is longer, the gouging may be likely to arise in.the sublevel region of the workpiece 2, if the stop time is too long at the inner corner portion as shown in FIG. 6. Thereby, thegougingmaybe left in the product portion when the inner corner portion is on the product side. In such case, since the inner corner portion and the outer corner portion are provided with the different reference values (reference value of discharge frequency or reference value of mean bath voltage), and either the inner corner portion side or the outer corner portion side becomes the product side, the stopped relative movement may be released by referring to a reference value on the product side.

In the case where the inner corner portion and the outer corner portion have different reference values, the reference value for the inner corner portion may be set such that the relative movement stop time may be shorter to prevent the gouging from arising because the gouging is likely to arise in the sublevel region of the workpiece in the inner corner portion, and the reference value for the outer corner portion may be set such that the relative movement stop time may be longer to enable the deflection of the wire electrode to be removed securely in the outer corner portion.

Instead of using the decision criterion of whether or not the discharge frequency is lower than or equal to a predetermined reference value, or the mean bath voltage is greater thain or equal to a predetermined reference value, two decisioncriteriacanbe employedof whetherornot thedischarge frequency is lower than or equal to the reference value, or the mean bath voltage is greater than or equal to the reference value, and whether or not the relative movement stop time is greater than or equal to a reference time. In the case of referring to the discharge frequency and the relative movement stop time, the stopped relative movement is released at an earlier time when the discharge frequency is low,er than the reference value, or when the relative movement stop time is greater than or equal to the reference time. Also, in the case of referring to the mean bath voltage and the relative movement stop time, the stopped relative movement is released at an earlier time when the mean bath voltage is greater than the reference value, or when the relative movement stop time is greater than or equal to the reference time in the case of referring to two conditions for releasing the stopped relative movement, including the mean bath voitage and the relative movement stop time, the reference time is set to be slightly longer, and the stopped relative movement may be released when the relative movement stop time is greater than or equal to the reference time. Thereby, it is possible to eliminate the situation where the stopped relative movement at the corner portion can not be released due to a trouble such as a short circuit during the machining to increase the mean bath voltage less sufficiently while the relative movement is stopped.

While machining a circular arc portion (from point B to point C) in FIG. 2(a) and a portion extending the distance L (from point C to point D) represented by the following expression (3), that is, the portion from point B to point D, the pulse quiescent time OFF or the mean bath voltage VG is set such that the pulse quiescent time OFFcorner satisfies OFFini≦OFFcorner≦OFFpre, or the mean bath voltage VGcorner satisfies VGini≦VGcorner≦VGpre, whereby the workpiece is machined while the discharge energy is kept small.

$$L=(d/2+g-R)/\tan(\theta/2)+d/2 \qquad (3)$$

Where d is a diameter of the wire electrode, g is a discharge gap, R is a radius of the corner portion drawn along the machining path, and θ is a corner portion angle. If L is less than or equal to 0, L is equalized to zero.

More specifically, it is considered that as the radius R of the corner portion is larger, or the corner portion angle θ is larger, the shear droop is less likely to arise at the corner portion, and the deflection of wire electrode is allowed to some extent, whereby the percentage of changing the control amount of OFFcorner or.VGcorner (e.g., ratio of OFFcorner or VGcorner to OFFini or VGini) is reduced.

The relation between the radius R of the corner portion and the corner portion angle θ and the percentage of changing the control amount can be obtained by the experiments.

As described above, the radius R of the corner portion and the corner portion angle θ and the percentage of changing the control amount corresponding to the machining configuration precision of the workpiece may be obtained in advance and stored in the memory means within the control means 16 as shown in FIG. 1, for example, and retrieved in accordance with the machining condition.

Since the percentage of changing the control amount is at minimum as required not to reduce the discharge energy than necessary, the machining time can be suppressed.

Figure 7:
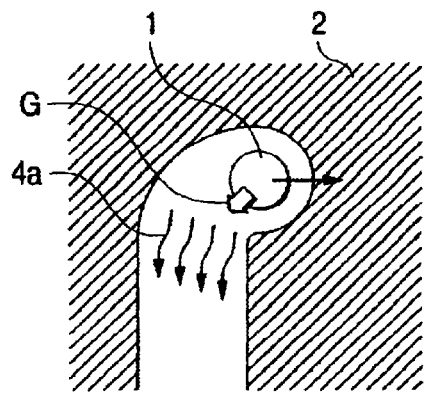
FIGS. 7(a) and 7(b) are explanatory views showing an example of working the corner portion.
Figure 7:
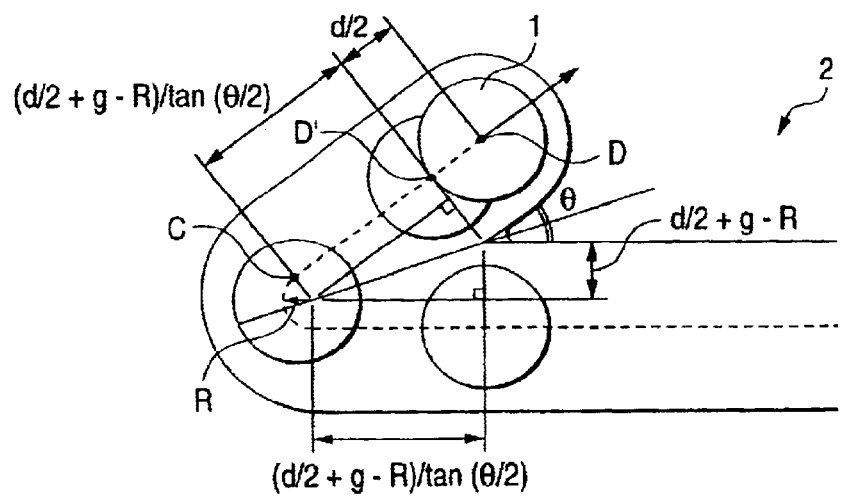

At the corner portion, since the working fluid tends to flow in a direction 4a before the directioinal change, the wire electrode 1 is likely to deflect in the direction before the directional change (deflecting direction G), as shown in FIG. 7(a). However, the discharge energy is maintained at the same value as the set value at the corner portion, until the entire wire electrode 1 fully enters into the working groove after the directional change (from point C after passing the corner portion to point D left away by the distance L defined by the expression (3)), or up to the position (point D) at which it fully enters into the working groove after the directional change, as shown FIG. 7(b).

Figure 8:
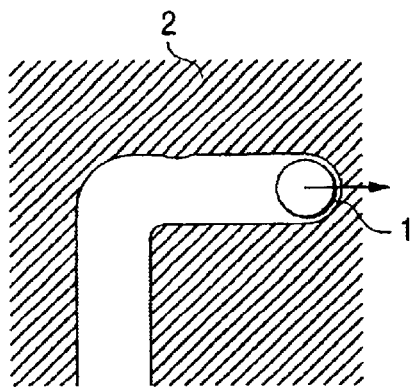
FIG. 8 is an explanatory view showing an example of working the corner portion.

With the wire discharge machining method and apparatus as disclosed in JP-A-2000-84743, the terminal point of the machining path within the predetermined distance L is defined as the position (e.g., point D' in FIG. 7(b)) at which the former half of the wire electrode 1, circular in cross section, fully enters into the working groove after the directional change (accordingly, the value of L is different from that of the expression (3)) Though the wire electrode 1 is likely to flex in a direction before the directional change due to flow 4a of the working fluid, as shown in FIG. 7(a), the machining rate and the discharge energy at point D' are reset, possibly producing a convex portion at the exit of the corner portion, as shown in FIG. 8.

In this invention, the predetermined distance L is the value defined in accordance with the expression (3), that is, the distance from point C after passino the corner portion in FIG. 7(b) to point D at which the entire wire electrode 1 fully enters into the working groove after the directional change, or its similar distance. The discharge energy is maintained almost at the set value at the corner portion, until the wire electrode does not flex due to a flow of the working fluid (flow 4a in FIG. 7(a)), whereby the machining configuration precision of the corner portion can be improved without giving rise to the convex portion at the corner exit.

Next, if the wire electrode 1 arrives at point D in FIG. 2(a), the pulse quiescent time or the mean bath voltage is changed in accordance with the expression (4) or (5) that is a quadratic function of the distance, for example, until reaching point E, andthen reset to the value before working the corner portion.

$$\text{OFF}=\text{OFFcorner}-\{(\text{OFFcorner}-\text{OFFini})/\text{Lpost}^2\}\times(S2^2) \qquad (4)$$

$$\text{VG}=\text{VGcorner}-\{(\text{VGcorner}-\text{VGini})/\text{Lpost}^2\}\times(S2^2) \qquad (5)$$

Where Lpost is a predetermined distance (from point D to point E) set not to cause a short circuitor disconnection after working the distance L, and S2 is a distance from point D.

Since the pulse quiescent time or the mean bath voltage is reset to value before working the corner portion so that the tempcral change rate of the discharge energy is almost constant, there is the same effect in the corner control nost-block distance Loost (from point D to Point E) as in the corner control pre-block distance Lpre (from point A to point B).

Second Embodiment

Figure 9:
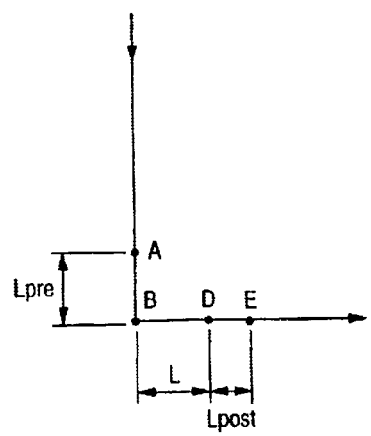
FIGS. 9(a)–9(c) are explanatory diagrams showing a wire discharge machining method according to a second embodiment of the invention.
Figure 9:
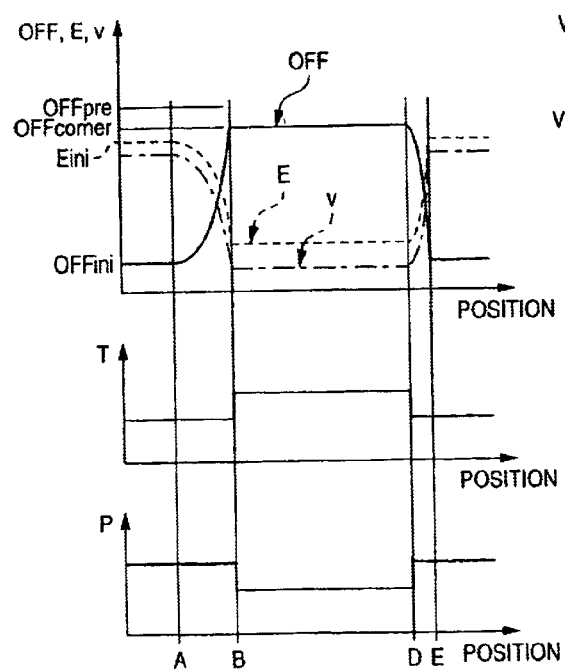
Figure 9:
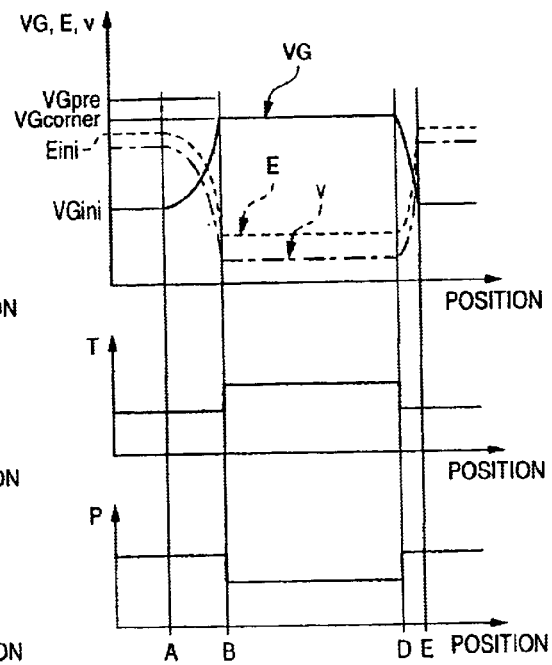
Figure 10:
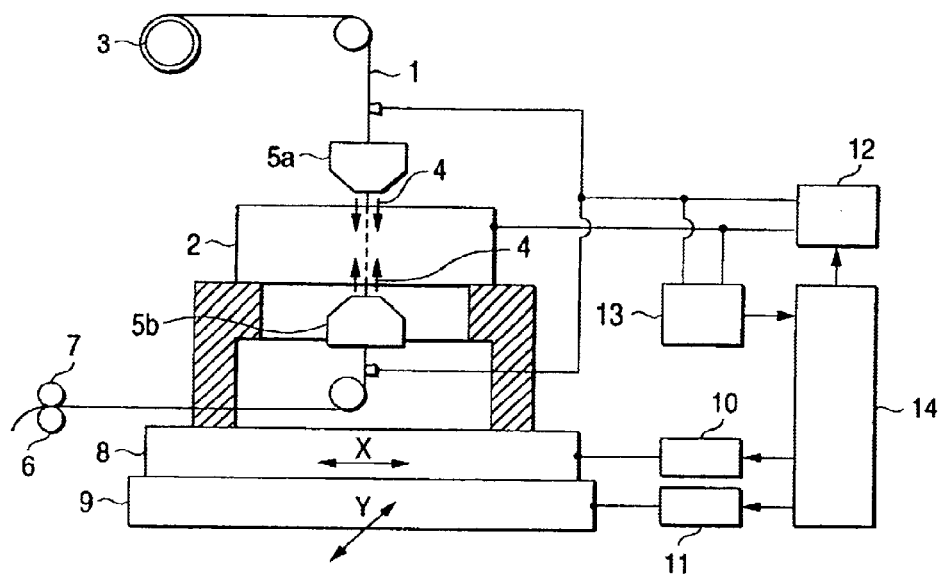
FIG. 10 is an explanatory diagram showing the constitution of the conventional wire discharge machining apparatus.
Figure 11:
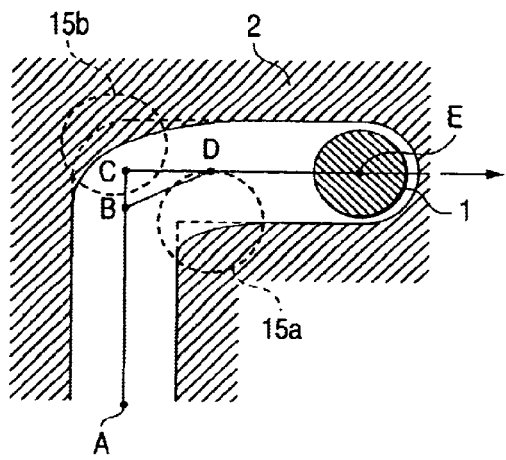
FIGS. 11(a) and 11(b) are explanatory views showing an example of working the corner portion by the conventional wire discharge machining apparatus.
Figure 11:
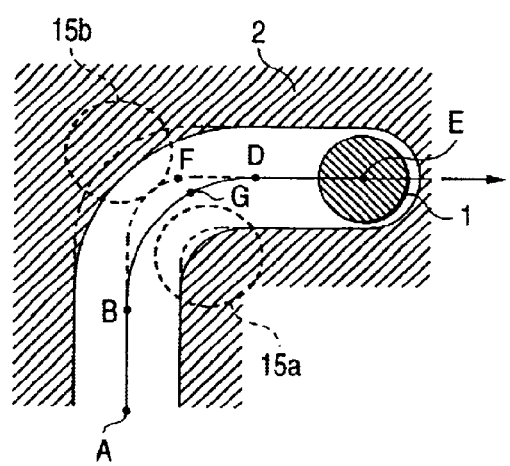

FIG. 9 is an explanatory diagram showing a wire discharge machining method according to a second embodiment of the invention. FIG. 9(a) is an explanatory diagram showing a machining process for the edge corner portion, FIG. 9(b) is an explanatory diagram for the machining control of controlling the pulse quiescent time OFF to work the edge corner portion, and FIG. 9(c) is an explanatory diagram for the machining control of controlling the mean bath voltage VG to work the edge corner portion. The same or like parts are designated by the same reference signs as in FIGS. 2 and 9. The wire discharge machining apparatus according to the second embodiment of this invention is the same in the constitution and operation as described in the first embodiment and shown in FIG. 1.

The corner control in FIG. 9 corresponds to the case without the portion from point B to point C as described in the first embodiment and shown in FIG. 2, in which case the radius R of the corner portion drawn along the machining path is made zero in calculating L in the expression (3) of the first embodiment.

Industrial Applicability

As described above, the wire discharge machining method and apparatus according to this invention is suitably employed for the wire charge machining operation.

What is claimed is:

1. A wire discharge machining method for machining a workpiece by supplying a discharge energy into an interpole space between a wire electrode and the workpiece while moving the workpiece relative to the wire electrode, the method comprising:

a first step of working the workpiece by decreasing gradually the discharge energy from a point located a first predetermined distance prior to a corner portion entry on a machining path of the wire electrode, wherein a temporal change rate of the discharge energy increases in the firts predetermined distance;

a second step of stopping the relative movement between the wire electrode and the workpiece at the corner portion entry;

a third step of releasing the stopped relative movement in accordance with a predetermined decision criterion;

a fourth step of working the workpiece in the corner portion and a portion extending a second distance away from the corner portion on the machining path of the wire electrode with a reduced discharge energy that is lower than the discharge energy at the point located the first predetermined distance prior to the corner portion entry; and a fifth step of working the workpiece by increasing gradually the discharge energy after passing the second distance till passing a third distance on the machining path of the wire electrode.

2. The wire discharge machining method according to claim 1, further comprising making almost constant a temporal change rate of the discharge energy in working the workpiece at at least one of the first step and the fifth step.

3. The wire discharge machining method according to claim 1, further comprising varying the pulse quiescent time or mean bath voltage as a quadratic function of distance in working the workpiece at at least one of the first step and the fifth step.

4. The wire discharge machining method according to claim 1, wherein the decision criterion at the third step is whether or not the discharge frequency is lower than or equal to a predetermined reference value, or the mean bath voltage is greater than or equal to a predetermined reference value.

5. The wire discharge machining method according to claim 4, wherein different reference values are provided corresponding to the inner corner side and the outer corner side of the corner portion, in which the decision criterion at the third step employs a reference value on the corner side that becomes the product side.

6. The wire discharge machining method according to claim 1, wherein the decision criterion at the third step is whether or not the discharge frequency is lower than or equal to a predetermined reference v aluc or the stop time of the relative movement is longer than or equal to a reference time, or whether or not the mean bath voltage is greater than or equal to a predetermined reference value or the stop time of the relative movement is longer than or equal to the reference time.

7. The wire discharge machining method according to claim 1, wherein the second distance is defined as the distance from a transit point of the corner portion to a point at which the entire wire electrode fully enters into a working groove after effecting a directional change.

8. The wire discharge machining method according to claim 1, further comprising at least one of increasing the set value of wire tension ibove the set value before working the corner portion and decreasing the set value of pressure or flow of a working fluid jet below the set value before working the corner portion.

9. A wire discharge machining apparatus for machining a workpiece, the apparatus comprising:

working power supplying means for supplying a discharge energy into an interpole space between a wire electrode and the workpiece;

working fluid supplying means for supplying a working fluid into the interpole space positioning means for moving the wire electrode and the workpiece relatively; and control means for (1) controlling the working power supplying means to decrease gradually the discharge energy from a point located a first predetermined distance prior to a corner portion entry on a machining path of the wire electrode, wherein a temporal change rate of the discharge energy increases in the first predetermined distance, (2) stopping the relative movement between the wire electrode and the workpiece at the corner portion entry, (3) controlling the positioning means to release the stopped relative movement in accordance with a predetermined decision criterion and resume the relative movement, (4) controlling the working power supplying means to decrease the discharge energy for working the workpiece in the corner portion and a portion extending a second distance away from the corner portion on the machining path of the wire electrode down to a reduced discharge energy that is lower than the discharge energy at the point located the first predetermined distance prior to the corner portion entry, and (5) controlling the working power supplying means to increase gradually the discharge energy after passing the second distance on the machining path of the wire electrode till passing a third distance.

10. The wire discharge machining apparatus claim 9, wherein the control means controls the working power supplying means to supply the discharge energy on the basis of the pulse quiescent time or mean bath voltage.

11. The wire discharge machining apparatus according to claim 10, wherein the control means controls the working power supplying means to decrease or increase gradually the discharge energy by varying the pulse quiescent time or mean bath voltage as a quadratic function of distance.

12. The wire discharge machining apparatus according to claim 9, wherein the control means controls the working power supplying means to decrease or increase gradually the discharge energy by making almost constant a temporal change rate of the discharge energy.

13. The wire discharge machining apparatus according to claim 9, wherein the predetermined decision criterion is whether or not the discharge frequency is lower than or equal to a certain reference value. or the mean bath voltage is greater than or equal to a certain reference value.

14. The wire discharge machining apparatus according to claim 13, wherein different reference values are provided corresponding to the inner corner side and the outer corner side of the corner portion, in which the predetermined decision criterion employs a reference value on the corner side that becomes the product side.

15. The wire discharge machining apparatus according to claim 9, wherein the predetermined decision criterion is whether or not the discharge frequency is lower than or equal to a certain reference value or the stop time of the relative movement is longer than or equal to a reference time, or whether or not the mean bath voltage is greater than or equal to a certain reference value or the stop time of the relative movement is longer than or equal to the reference time.

16. The wire discharge machining apparatus according to claim 9, wherein the second distance is defined as the distance from a transit point of the corner portion to a point at which the entire wire electrode fully enters into a working groove after effecting a directional change.

17. The wire discharge machining apparatus according to claim 9, wherein the control means at least one of increases the set value of wire tension above the set value before working the corner portion and decreases the set value of pressure or flow of a working fluid jet below the set value before working the corner portion in a course from the point of the corner portion entry at which the relative movement beteen the wire electrode and the w,orkpiece is stopped till passing the second distance away from the corner portion.

* * * * *